United States Patent
Kanagawa et al.

(10) Patent No.: US 7,914,896 B2
(45) Date of Patent: Mar. 29, 2011

(54) MOISTURE-CURABLE POLYURETHANE HOT MELT ADHESIVE, AND LAMINATE AND MOISTURE-PERMEABLE FILM USING THE SAME

(75) Inventors: Yoshinori Kanagawa, Osaka (JP); Minoru Takahashi, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 12/448,523

(22) PCT Filed: Jun. 3, 2008

(86) PCT No.: PCT/JP2008/060197
§ 371 (c)(1),
(2), (4) Date: Jun. 24, 2009

(87) PCT Pub. No.: WO2009/011177
PCT Pub. Date: Jan. 22, 2009

(65) Prior Publication Data
US 2010/0104831 A1 Apr. 29, 2010

(30) Foreign Application Priority Data
Jul. 19, 2007 (JP) .................................. 2007-188221

(51) Int. Cl.
*B32B 27/40* (2006.01)
*C08G 18/42* (2006.01)
(52) U.S. Cl. ................. 428/423.1; 428/423.3; 428/198; 428/200; 526/935
(58) Field of Classification Search .................. 528/80; 526/935; 428/198, 200, 423.1, 423.3
See application file for complete search history.

(56) References Cited

U.S. PATENT DOCUMENTS

| 4,990,545 A | 2/1991 | Hourai et al. |
| 6,191,212 B1 * | 2/2001 | Kube ............................ 524/590 |
| 6,994,913 B1 | 2/2006 | Niki et al. |
| 7,641,968 B2 * | 1/2010 | Kanagawa et al. ........ 428/355 N |
| 2003/0221770 A1 * | 12/2003 | Meixner et al. ................ 156/230 |
| 2005/0032973 A1 | 2/2005 | Krebs et al. |
| 2007/0232764 A1 | 10/2007 | Minamida et al. |

FOREIGN PATENT DOCUMENTS

| JP | 02-167349 | 6/1990 |
| JP | 02-272013 | 11/1990 |
| JP | 2002-121274 | 4/2002 |
| JP | 2002-370335 | 12/2002 |
| JP | 2004-307658 | 11/2004 |
| JP | 2005-505664 | 2/2005 |
| JP | 2005-320520 | 11/2005 |

OTHER PUBLICATIONS

International Search Report dated Jul. 8, 2008, issued on PCT/JP2008/060197.

\* cited by examiner

*Primary Examiner* — Thao T. Tran
(74) *Attorney, Agent, or Firm* — Edwards Angell Palmer & Dodge LLP

(57) ABSTRACT

A moisture-curable polyurethane hot-melt adhesive containing a urethane prepolymer obtained by reacting a polyol (A) which comprises a polyester polyol (a-1) obtained by reacting a polyol prepared by the addition of bisphenol A with an alkylene oxide with both an aliphatic polycarboxylic acid and an aromatic polycarboxylic acid, a crystalline polyester polyol (a-2), and a polyoxyethylene glycol (a-3) having a number-average molecular weight of 2000 to 25000 with a polyisocyanate (B); and a moisture-permeable film, which are suitable for the production of sport wear, raincoats, shoes, fireman uniforms, military uniforms, and so on.

18 Claims, No Drawings

MOISTURE-CURABLE POLYURETHANE HOT MELT ADHESIVE, AND LAMINATE AND MOISTURE-PERMEABLE FILM USING THE SAME

TECHNICAL FIELD

The present invention relates to a moisture-curable polyurethane hot melt adhesive which can be used for various applications, including the manufacture of moisture-permeable, waterproof clothes such as sportswear, and a laminate and a moisture-permeable film.

BACKGROUND ART

Sportswear such as mountain climbing wear is generally required to have mobility or lightness upon wearing, as well as excellent moisture permeability and the like. Moisture permeability is an important property for suppressing the unpleasant feeling due to, for example, the sultriness caused by moisture generated from the body, such as sweat, staying within the clothes.

As for the clothes having excellent moisture permeability, there is known, for example, a heat-retaining, moisture-permeable, waterproof cloth prepared by bonding a film containing a water-swellable, moisture-permeable urethane resin and heat reflective fine metal fragments, and a fiber cloth, using a reactive hot melt adhesive of a moisture-curable urethane resin (see, for example, Patent Document 1).

However, the reactive hot melt adhesive used in the Patent Document 1 does not have moisture permeability per se. For that reason, when this adhesive is used in the adhesion of moisture-permeable base materials, the adhesive seals the moisture permeating pores present in the moisture-permeable base materials, and as a result, the excellent moisture permeability possessed by the base materials may be markedly decreased.

Furthermore, since the reactive hot melt adhesive which is specifically exemplified in the Patent Document 1 may form an adhesive layer having relatively high hardness, when the adhesive is used in the adhesion of base materials having a soft and pliable texture, the soft and pliable texture of the base materials is markedly impaired, and as a result, the wear comfort of clothes made from the base materials may be decreased.

As the method of preventing significant decreases in the moisture permeability or pliability of a base material, a method is known for adhering a base material according to an intermittent application method (dot bonding method) in which an adhesive is applied on the base material in a dotted pattern, as described in the Patent Document 1.

However, in a laminate having a plurality of base materials laminated according to the intermittent application method, because the contact points between the base materials and the adhesive are usually very small, sufficient ordinary state adhesive strength may not maintained, and delamination of the base materials may occur. In particular, when clothes and the like produced by the above-described method are laundered in water, the adhesive strength of the adhesive is markedly decreased under the influence of water or detergent, and as a result, delamination of base materials may occur.

On the other hand, the delamination of base materials can be suppressed to some extent, for example, by increasing the amount of adhesive applied, or the like. However, since the moisture permeability or pliability possessed by a base material is decreased as an increase in the amount of application of the adhesive, it was difficult to elicit a good balance between excellent adhesive strength, moisture permeability and pliability in such methods.

As described above, under the current circumstances, a moisture-curable polyurethane hot melt adhesive, which would not cause a significant decrease in the excellent moisture permeability or pliability of base materials and has all of excellent ordinary state adhesive strength, water-resistant adhesive strength, moisture permeability and pliability, has not yet been found.

However, concerning the aforementioned base material which has excellent moisture permeability and can be used in the manufacture of clothes such as sportswear, it is known that films formed from porous polytetrafluoroethylene or urethane resins can also be used, in addition to fiber cloths which have porous relatively between fibers.

These moisture-permeable films are usually formed by flow casting a solvent-based or aqueous resin solution on a releasable base material, and then volatilizing the solvent.

However, the production method of films as described above has been regarded as a problem in recent years, in view of requiring enormous energy upon volatilizing the solvent.

Therefore, there is a demand for the development of a moisture-permeable film which can be produced using largely reduced energy consumption, and has excellent moisture permeability and pliability.

Patent Document 1: Japanese Patent Application Laid-Open No. 2002-370335

DISCLOSURE OF INVENTION

An object of the invention is to provide a moisture-curable polyurethane hot melt adhesive which has excellent moisture permeability and pliability, and is capable of forming an adhesive layer having excellent ordinary state adhesive strength and water-resistant adhesive strength.

Another object of the invention is to provide a moisture-permeable film having excellent moisture permeability and pliability, which can be produced using largely reduced energy consumption.

The inventors of the present invention thought that in order to obtain an adhesive which is not likely to cause marked decreases in the good moisture permeability or pliability exhibited by base materials, it is important to impart excellent moisture permeability and pliability to the adhesive layer itself formed by an adhesive, and proceeded with investigations.

As for the method of imparting excellent moisture permeability to a moisture-curable polyurethane hot melt adhesive, the possibility of using a hydrophilic polyol such as polyoxyethylene glycol as a polyol component which constitutes a urethane prepolymer contained in the adhesive, was investigated.

However, an adhesive containing a urethane prepolymer obtained by reacting a general purpose polyoxyethylene glycol having a relatively low molecular weight with polyisocyanate, did not have a practically sufficient level of moisture permeability.

Furthermore, the inventors also conducted an investigation on a moisture-curable polyurethane hot melt adhesive containing a urethane prepolymer obtained by reacting a relatively high molecular weight polyoxyethylene glycol having a number average molecular weight of 2000 to 25000, with polyisocyanate. An adhesive layer formed from this adhesive had good moisture permeability as compared to conventional products, but a marked decrease in the water-resistant adhesive strength was observed, due to the influence of the hydrophilization of the adhesive layer caused by polyoxyethylene glycol.

As for the method of enhancing the water-resistant adhesive strength, there may be mentioned, for example, a method of rendering the adhesive layer hydrophobic. However, the inventors of the present invention conceived that in order to impart excellent moisture permeability to an adhesive, it is after all necessary to use the aforementioned particular polyoxyethylene glycol which can render the adhesive layer hydrophilic, and thus proceeded with an investigation based on the use of polyoxyethylene glycol having a number average molecular weight of 2000 to 25000 as the polyol component.

The inventors thought it would be possible to impart a certain degree of water-resistant adhesive strength by increasing the crystallinity of a moisture-curable polyurethane hot melt adhesive. Thus, they conducted an investigation on a moisture-curable polyurethane hot melt adhesive obtained by reacting polyols with polyisocyanate, wherein the polyols include a crystalline polyester polyol as a polyol component, which is capable of imparting excellent initial adhesive strength and ordinary state adhesive strength to moisture-curable polyurethane hot melt adhesives; and the polyoxyethylene glycol having a number average molecular weight of 2000 to 25000, which is considered to contribute to an enhancement of moisture permeability.

Specifically, an investigation was made on the use of a long-chain aliphatic polyester polyol obtained by reacting 1,6-hexanediol and 1,12-dodecanedioic acid, or the use of a polyester polyol having a branched structure, obtained by reacting neopentyl glycol and adipic acid, as the crystalline polyester polyol, in combination with the polyoxyethylene glycol.

With the respective moisture-curable polyurethane hot melt adhesives obtained by using the polyols in combination, it was possible to form adhesive layers having good moisture permeability. However, the adhesives still did not show improvements in terms of water-resistant adhesive strength, and were not satisfactory in putting a step forward to a practically sufficient level in terms of ordinary state adhesive strength.

The inventor thought as to if it would be possible to have good balance between excellent moisture permeability and ordinary state adhesive strength, by enhancing the compatibility between the particular polyoxyethylene glycol which was considered useful for imparting moisture permeability, and the crystalline polyester polyol which was considered effective in enhancing adhesive strength, and thus investigated the possibility of enhancing the compatibility of these polyol components.

As a result, they found that a moisture-curable polyurethane hot melt adhesive containing a urethane prepolymer, which was obtained by reacting polyol components with a polyisocyanate component, had excellent moisture permeability, pliability, ordinary state adhesive strength and water-resistant adhesive strength, wherein the polyol components is combination of a polyoxyethylene glycol having a number average molecular weight of 2000 to 25000 and a crystalline polyester polyol, as well as a polyester polyol obtained by reacting a polyol prepared by addition of alkylene oxide to bisphenol A, with an aliphatic polycarboxylic acid and an aromatic polycarboxylic acid.

The moisture-curable polyurethane hot melt adhesive of the invention is an industrially useful invention which is well balanced between contradictory effects, such as having excellent moisture permeability and having, on the other hand, excellent water-resistant adhesive strength at a level of, for example, not causing delamination in the base material upon laundering in water.

That is, the invention relates to a moisture-curable polyurethane hot melt adhesive containing a urethane prepolymer, which is obtained by reacting polyols (A) including a polyester polyol (a-1) obtained by reacting a polyol prepared by addition of alkylene oxide to bisphenol A, with an aliphatic polycarboxylic acid and an aromatic polycarboxylic acid; a crystalline polyester polyol (a-2); and a polyoxyethylene glycol (a-3) having a number average molecular weight of 2000 to 25000, with polyisocyanate (B).

The invention also relates to a laminate having a moisture-permeable base material (I), on which the moisture-curable polyurethane hot melt adhesive in a heated molten state is intermittently applied, and adhered thereon, a moisture-permeable base material (II) of the same type or different type with respect to the moisture-permeable base material (I).

The invention also relates to a laminate having the moisture-permeable base material (I), on which the moisture-curable polyurethane hot melt adhesive in a heated molten state is intermittently applied, and adhered on both sides thereof, the moisture-permeable base material (II).

The invention also relates to a moisture-permeable film formed from a moisture-curable polyurethane hot melt composition containing a urethane prepolymer, the urethane prepolymer being obtained by reacting polyols (A) which include: a polyester polyol (a-1) obtained by reacting a polyol prepared by addition of alkylene oxide to bisphenol A, with an aliphatic polycarboxylic acid and an aromatic polycarboxylic acid; a crystalline polyester polyol (a-2); and a polyoxyethylene glycol (a-3) having a number average molecular weight of 2000 to 25000, with polyisocyanate (B).

The moisture-curable polyurethane hot melt adhesive of the invention can impart excellent ordinary state adhesive strength and water-resistant adhesive strength, even if the adhesive is used in the adhesion of moisture-permeable base materials such as moisture-permeable fabrics, in the production of clothes that are required to have a high level of moisture permeation performance, such as sportswear and raincoats for example, without causing significant decreases in the excellent moisture permeability originating from the moisture-permeable base materials, or in the soft and pliable texture. Thus, the moisture-curable polyurethane hot melt adhesive has a high value for industrial application.

Since the moisture-permeable film of the invention has excellent moisture permeability and a soft and pliable texture, the moisture-permeable film can be suitably used in, for example, sportswear, raincoats, shoes, firefighter uniforms, military uniforms, and the like.

BEST MODE FOR CARRYING OUT THE INVENTION

The moisture-curable polyurethane hot melt adhesive of the invention contains a urethane prepolymer, which is a reaction product of particular polyols (A) that will be described later, and polyisocyanate (B), as a main component, and further contains additives and the like as necessary.

The urethane prepolymer which constitutes the moisture-curable polyurethane hot melt adhesive of the invention is a compound having in the molecule, an isocyanate group which is capable of forming a crosslinked structure by reacting with the moisture present in air or in the base material on which the adhesive is applied. The urethane prepolymer is a solid or viscous liquid at normal temperature. In general, urethane prepolymers usually have relatively low molecular weights, but since those skilled in the art also refer to such compounds having number average molecular weights (Mn) of several ten thousands as urethane prepolymers, it is also possible to use a urethane prepolymer having a number average molecular weight of several ten thousands in the present invention.

The number average molecular weight of the urethane prepolymer is preferably in the range of 500 to 30,000, and more preferably in the range of 1000 to 10,000. When the number average molecular weight of the urethane prepolymer is within the above-mentioned range, a moisture-curable polyurethane hot melt adhesive which has excellent fluidity or processability at the time of heating and melting, can be obtained.

The urethane prepolymer used in the invention has both characteristics of moisture-induced crosslinking reactivity and hot melt properties.

The moisture-induced crosslinking reactivity possessed by the urethane prepolymer originates from the crosslinking reaction which is initiated when the isocyanate group in the urethane prepolymer reacts with moisture (water), and thus it is a property attributable to the isocyanate group in the urethane prepolymer.

On the other hand, the hot melt properties possessed by the urethane prepolymer are properties attributable to the molecular structure of the urethane prepolymer selected, and it is a generic name for the properties or substances, which is a solid or viscous liquid at normal temperature, but melts to a fluid state or a liquid state when it is heated. As the compound having hot melt properties, for example, hot melts represented by ethylene-vinyl acetate-based compounds are generally known. Hot melts are of solventless type, and at the same time, they have a nature such that they are solid or viscous in nature at normal temperature, but when heat is applied, they melt and attain to a state of being applicable, and when cooled, cohesive power arises again. Therefore, hot melts are useful as, for example, solventless type adhesives, coating materials, or the like.

The hot melt properties are closely related to the softening point, and in general, as the softening point of the urethane prepolymer used is lower, workability becomes better. On the other hand, there is a tendency that as the softening point is higher, the adhesive strength becomes better.

The softening point of the urethane prepolymer used in the invention is preferably in the range of 40 to 120° C., and when the softening point of the urethane prepolymer is within this range, a moisture-curable polyurethane hot melt adhesive having good workability and excellent adhesive strength is obtained. Here, the softening point as used herein refers to a temperature at which the urethane prepolymer starts to undergo thermal flow and loses cohesive power when the temperature of the urethane prepolymer is increased stepwise, and specifically, the softening point refers to a value determined according to the ring and ball method (JIS K-6301).

As for the method for adjustment of the softening point of the urethane prepolymer, for example, (1) a method for adjustment based on the molecular weight of the urethane prepolymer, (2) a method for adjustment based on the crystallinity of the polyalkylene chain of the polyester polyol, in the case of using a polyester polyol as a raw material, (3) a method for adjustment based on the introduction of an aromatic cyclic structure, (4) a method for adjustment based on the content of urethane bond, and the like can be employed, and these can be used alone, or can be used in combination of a number of methods.

In the method for adjustment of the softening point of the urethane prepolymer (1), there is generally a tendency that the softening point increases as an increase in the molecular weight of the urethane prepolymer. Furthermore, the adjustment of the molecular weight of the urethane prepolymer can be achieved by employing, for example, techniques such as adjustment based on the molar ratio of polyisocyanate (B) and polyols (A), and use of high molecular weight polyols, and there is no particular limitation.

In the method for adjustment of the softening point of the urethane prepolymer (2), there is generally a tendency that as the number of carbon atoms in the polyalkylene chain of the crystalline polyester polyol increases, the crystallinity of the resulting urethane prepolymer is enhanced, and the softening point increases. There is also a tendency that as the amount of use of the crystalline polyester polyol increases, the softening point increases.

In the method for adjustment of the softening point of the urethane prepolymer (3), there is usually a tendency that as the content of the aromatic cyclic structure in the urethane prepolymer increases, the softening point increases.

In the method for adjustment of the softening point of the urethane prepolymer (4), there is usually a tendency that as the content of the urethane bond increases, the softening point increases.

The urethane prepolymer used in the invention can be produced by reacting the polyols (A), which will be described below, with polyisocyanate (B), under the conditions such that the isocyanate group in the polyisocyanate (B) is in excess with respect to the hydroxyl group in the polyols (A).

As for the polyols (A), it is important to use a combination of a polyester polyol (a-1) obtained by reacting a polyol prepared by addition of alkylene oxide to bisphenol A, with an aliphatic polycarboxylic acid and an aromatic polycarboxylic acid; a crystalline polyester polyol (a-2); and a polyoxyethylene glycol (a-3) having a number average molecular weight of 2000 to 25000, as a main component, for the purpose of solving the problems of the invention. When the polyols are used in combination, an adhesive which is well balanced between contradictory effects, such as having excellent moisture permeability at a practically sufficient level, and having, on the other hand, excellent water-resistant adhesive strength at a level of, for example, not causing delamination in the base material upon laundering in water, and which has both a soft and pliable texture and excellent ordinary state adhesive strength, can be obtained. Furthermore, by the combination of polyols, a moisture-permeable film having practically sufficient moisture permeability and excellent pliability can be obtained.

First, the polyester polyol (a-1) will be described.

The polyester polyol (a-1) is a condensation reaction product of a polyether polyol prepared by addition of alkylene oxide to bisphenol A, with an aliphatic polycarboxylic acid and an aromatic polycarboxylic acid.

The polyester polyol (a-1) contributes to an enhancement of the compatibility between the crystalline polyester polyol (a-2) and the polyoxyethylene glycol (a-3). When the compatibility of these compounds are enhanced, a moisture-curable polyurethane hot melt adhesive having excellent moisture permeability, pliability, ordinary state adhesive strength, and water-resistant adhesive strength, can be obtained.

As for the polyester polyol (a-1), it is preferable to use a compound having a number average molecular weight in the range of 500 to 10,000, and it is particularly preferable to use a product having a number average molecular weight in the range of 1000 to 7000. When a polyester polyol having a number average molecular weight in the above-mentioned range is used as the polyester polyol (a-1), the viscosity of the resulting adhesive in a heated molten state can be decreased, and as a result, the coating workability of the adhesive in a heated molten state can be enhanced. Furthermore, the compatibility between the crystalline polyester polyol (a-2) and the polyoxyethylene glycol (a-3) can be further enhanced.

As for the polyester polyol (a-1), it is preferable to use a compound having a glass transition temperature in the range of −50 to 40° C., because the flexibility, particularly low temperature flexibility, of the resulting adhesive layer can be enhanced.

The glass transition temperature can be adjusted by, for example, adjusting the amount of addition of alkylene oxide to the bisphenol A. Furthermore, the glass transition temperature as used herein represents the endothermic peak temperature measured using a DSC (differential scanning calorimetric analyzer), from −80° C. at a rate of temperature increase of 5° C./min in a nitrogen atmosphere.

The polyester polyol (a-1) can be produced by subjecting a polyol prepared by addition of alkylene oxide to bisphenol A, an aliphatic polycarboxylic acid and an aromatic polycarboxylic acid to a condensation reaction.

The polyol prepared by addition of alkylene oxide to bisphenol A is a polyether polyol, and for example, a product produced by alkylene oxide addition reaction by a conventionally known method, using bisphenol A as an initiator, can be used.

As the alkylene oxide, for example, ethylene oxide, propylene oxide or the like can be used, and among them, it is preferable to use propylene oxide.

It is preferable to add the alkylene oxide in an amount of 1 to 10 moles, and more preferably 2 to 8 moles, with respect to the bisphenol A. By using a polyol prepared by alkylene oxide addition to bisphenol A in a proportion in the above-described range, the compatibility between the crystalline polyester polyol (a-2) and polyoxyethylene glycol (a-3) is further enhanced, and as a result, an adhesive having ordinary state adhesive strength, water-resistant adhesive strength, moisture permeability and a soft and pliable texture at practically sufficient levels can be obtained. Furthermore, a moisture-permeable film having practically sufficient moisture permeability and pliability can be obtained.

As for the polycarboxylic acid which reacts with the polyol prepared by addition of alkylene oxide to bisphenol A, it is important to use an aliphatic polycarboxylic acid and an aromatic polycarboxylic acid in combination, for enhancing the compatibility between the crystalline polyester polyol (a-2) and the polyoxyethylene glycol (a-3), or enhancing the initial cohesive power of the adhesive of the invention. In the case of using any one of the aliphatic polycarboxylic acid and the aromatic polycarboxylic acid, the compatibility between the crystalline polyester polyol (a-2) and the polyoxyethylene glycol (a-3) is decreased, and there may occur a decrease in the soft and pliable texture, ordinary state adhesive strength or water-resistant adhesive strength of the adhesive layer thus formed.

As for the aliphatic polycarboxylic acid, for example, succinic acid, maleic acid, adipic acid, glutaric acid, pimelic acid, suberic acid, azelaic acid, sebacic acid, dodecanedicarboxylic acid, and the like can be used. Among them, from the viewpoint of forming an adhesive layer having excellent initial cohesive power or durability (heat resistance and resistance to hydrolysis), it is preferable to use an aliphatic polycarboxylic acid having 6 to 10 carbon atoms, and specifically, it is preferable to use sebacic acid, adipic acid or dodecanedicarboxylic acid.

As for the aromatic polycarboxylic acid, for example, phthalic acid, isophthalic acid, terephthalic acid and the like can be used, and it is preferable to use isophthalic acid.

The ratio of use of the aliphatic polycarboxylic acid and the aromatic polycarboxylic acid is preferably such that [aliphatic polycarboxylic acid/aromatic polycarboxylic acid]= 10/90 to 50/50 (equivalent ratio), from the viewpoint of obtaining an adhesive capable of forming a pliable adhesive layer or a moisture-permeable film by enhancing the compatibility between the crystalline polyester polyol (a-2) and the polyoxyethylene glycol (a-3).

The polycarboxylic acid may also be used in combination with another polycarboxylic acid, if necessary, such as an aliphatic cyclic structure-containing polycarboxylic acid.

As for the polyester polyol (a-1), in particular, it is preferable to use a polyester polyol obtained by subjecting a polyether polyol prepared by adding 4 to 8 moles of propylene oxide to bisphenol A, as well as sebacic acid and isophthalic acid to a condensation reaction, because the compatibility between the crystalline polyester polyol (a-2) and the polyoxyethylene glycol (a-3) is further enhanced, and as a result, an adhesive capable of manifesting particularly excellent pliability, ordinary state adhesive strength and water-resistant adhesive strength, is obtained. Furthermore, it is preferable to use the aforementioned combination of polyols, because a moisture-permeable film having practically sufficient pliability can be obtained.

It is preferable to use the polyester polyol (a-1) in an amount of 5 to 30 parts by mass, and more preferably 5 to 20 parts by mass, relative to 100 parts by mass of the total amount of the polyol (A) constituting the urethane prepolymer. Thereby, the compatibility between the crystalline polyester polyol (a-2) and the polyoxyethylene glycol (a-3) is further enhanced, and an adhesive capable of manifesting ordinary state adhesive strength, water-resistant adhesive strength, moisture permeability, and a soft and pliable texture at practically sufficient levels, can be obtained. Furthermore, when the aforementioned combination of polyols is used, a moisture-permeable film having practically sufficient pliability can be obtained.

Next, the crystalline polyester polyol (a-2) will be described.

The crystalline polyester polyol (a-2) which is used in the production of the urethane prepolymer, can maintain the excellent moisture permeability possessed by the adhesive or moisture-permeable film of the invention, and can impart excellent initial adhesive strength and a decrease in the surface tackiness at the time of film production.

Here, the crystallinity as used in the invention means that a peak for the heat of fusion could be confirmed when measurement was made using a differential scanning calorimeter (DSC). More simply, the crystallinity of one substance can be distinguished from another by observing whether the substance is solid or semi-solid at normal temperature.

As for the crystalline polyester polyol (a-2), it is preferable to use a polyester polyol which is semi-solid at normal temperature, from the viewpoint of imparting appropriate crystallinity to a moisture-curable polyurethane hot melt adhesive and a moisture-permeable film, and as a result, imparting a further soft and pliable texture without impairing the excellent ordinary state adhesive strength and water-resistant adhesive strength.

As for the polyester polyol which is semi-solid at normal temperature, it is preferable to use a compound having a branched chain in the molecule, and it is preferable to use, for example, a compound having a 2,2-dimethyl-1,3-propylene group in the molecule in obtaining an adhesive which is capable of forming an adhesive layer having excellent ordinary state adhesive strength and water-resistant adhesive strength, as well as a further soft and pliable texture, and a moisture-permeable film having a soft and pliable texture.

The 2,2-dimethyl-1,3-propylene group is preferably used in an amount in the range of 5 to 50% by mass relative to the total amount of the crystalline polyester polyol (a-2). Furthermore, from the viewpoints of maintaining the soft and pliable texture of the moisture-permeable film of the invention, and preventing the blocking between the moisture-permeable films, it is more preferable to use the neopentyl glycol in an amount in the range of 10 to 30% by mass.

The crystalline polyester polyol (a-2) preferably has a number average molecular weight of 10,000 or less, and more preferably in the range of 1500 to 5000.

As for the crystalline polyester polyol (a-2), for example, a product obtained by subjecting a low molecular weight polyol and a polycarboxylic acid to a condensation reaction, can be used.

As for the low molecular weight polyol, for example, aliphatic polyols such as ethylene glycol, 1,4-butanediol, neopentyl glycol, 1,6-hexanediol, 1,8-octanediol and 10-decanediol can be used. Among them, from the viewpoint of obtaining an adhesive layer or moisture-permeable film having a soft and pliable texture by introducing an appropriate branched structure into the crystalline polyester polyol (a-2), it is preferable to use neopentyl glycol.

The neopentyl glycol can introduce a 2,2-dimethyl-1,3-propylene group into the crystalline polyester polyol (a-2).

It is preferable to use the neopentyl glycol in an amount in the range of 5 to 50% by mass based on the total amount of the low molecular weight polyol and polycarboxylic acid used in the production of the crystalline polyester polyol (a-2), in view of obtaining an adhesive capable of forming an adhesive layer having excellent ordinary state adhesive strength and water-resistant adhesive strength as well as a further soft and pliable texture, and a moisture-permeable film having a soft and pliable texture. Furthermore, from the viewpoint of maintaining the soft and pliable texture of the moisture-permeable film of the invention and preventing blocking between the moisture-permeable films, it is more preferable to use the neopentyl glycol in an amount in the range of 10 to 30% by mass.

As the polycarboxylic acid, for example, an aliphatic polycarboxylic acids such as succinic acid, adipic acid, sebacic acid, dodecanedioic acid or dodecamethylenecarboxylic acid, or phthalic acid, isophthalic acid, terephthalic acid, hexahydroisophthalic acid, or phthalic anhydride can be used. As the polycarboxylic acid, it is preferable to use an aliphatic polycarboxylic acid from the viewpoint of increasing the crystallinity possessed by the crystalline polyester polyol (a-2).

As for the crystalline polyester polyol (a-2), it is preferable to use a product obtained by using neopentyl glycol and 1,6-hexanediol as the low molecular weight polyol, and adipic acid as the polycarboxylic acid, in view of obtaining an adhesive capable of forming an adhesive layer having excellent ordinary state adhesive strength and water-resistant adhesive strength and a soft and pliable texture, and a moisture-permeable film having a soft and pliable texture.

It is preferable to use the crystalline polyester polyol (a-2) in an amount of 10 to 30 parts by mass, and more preferably 15 to 25 parts by mass, relative to 100 parts by mass of the total amount of the polyols (A) which constitute the urethane prepolymer. Thereby, an adhesive capable of forming an adhesive layer having excellent ordinary state adhesive strength and water-resistant adhesive strength and a soft and pliable texture, and a moisture-permeable film having an excellent soft and pliable texture can be obtained.

Next, the polyoxyethylene glycol (a-3) used in the production of the urethane prepolymer will be described.

The polyoxyethylene glycol (a-3) is a compound having a number average molecular weight of 2000 to 25000, and is necessary for imparting excellent moisture permeability to the moisture-curable polyurethane hot melt adhesive and moisture-permeable film of the invention.

Here, if a polyoxyethylene glycol having a molecular weight less than 2000 is used instead of the polyoxyethylene glycol (a-3), the desired moisture permeability may not be imparted. On the other hand, in regard to a polyoxyethylene glycol having a number average molecular weight greater than 25000, production itself is difficult. Furthermore, if polyoxyethylene glycol is used, there is a tendency that the resulting moisture-curable polyurethane hot melt adhesive becomes highly hydrophilic, a marked decrease may occur in the water-resistant adhesive strength of the adhesive layer thus formed.

In the case of using a polyoxypropylene glycol, polytetramethylene glycol, polyoxybutylene glycol or the like, having a number average molecular weight of 2000 to 25000 instead of the polyoxyethylene glycol (a-3), it is difficult to impart moisture permeability of a practically sufficient level to the moisture-curable polyurethane hot melt adhesive or moisture-permeable film.

The moisture-curable polyurethane hot melt adhesive of the invention can have good balance between contradictory effects, such as excellent moisture permeability and excellent water-resistant adhesive strength, by using the polyoxyethylene glycol (a-3) in combination with the polyester polyol (a-1) or the crystalline polyester polyol (a-2).

As for the polyoxyethylene glycol (a-3), it is more preferable to use a compound having a number average molecular weight in the range of 2000 to 5500. When a polyoxyethylene glycol (a-3) having a number average molecular weight within this range is used in combination with the polyester polyol (a-1) or the crystalline polyester polyol (a-2), a moisture-curable polyurethane hot melt adhesive capable of manifesting ordinary state adhesive strength or water-resistant adhesive strength at practically sufficient levels can be obtained. Furthermore, by using the aforementioned polyols in combination, a moisture-permeable film having practically sufficient mechanical strength can be obtained.

As for the polyoxyethylene glycol (a-3), for example, a product obtained by ring-opening polymerizing ethylene oxide to a low molecular weight polyol as an initiator can be used.

As the low molecular weight polyol that can be used as an initiator in the production of the polyoxyethylene glycol (a-3), for example, ethylene glycol, 1,2-propylene glycol, 1,3-propylene glycol, 1,3-butylene glycol, 1,4-butylene glycol, 2,2-dimethyl-1,3-propanediol, 1,6-hexanediol, 3-methyl-1,5-pentanediol, 1,8-octanediol, diethylene glycol, triethylene glycol, dipropylene glycol, tripropylene glycol and the like may be mentioned.

As for the polyoxyethylene glycol (a-3), a product of ring-opening addition of γ-butyrolactone, ε-caprolactone or the like to a part of the polyoxyethylene glycol may also be used in a scope of not impairing the effects of the invention. Furthermore, as the polyoxyethylene glycol (a-3), a product of ring-opening addition of propylene oxide or the like to a part of the polyoxyethylene glycol may also be used in a scope of not impairing the effects of the invention.

The γ-butyrolactone, ε-caprolactone, propylene oxide or the like that can be added to the polyoxyethylene glycol (a-3) is preferably used in an amount of 20% by mass or less based on the whole polyoxyethylene glycol (a-3), from the viewpoint of maintaining excellent moisture permeability of the moisture-curable polyurethane hot melt adhesive or moisture-permeable film.

It is preferable to use the polyoxyethylene glycol (a-3) in an amount of 30 to 85 parts by mass, and more preferably 40 to 70 parts by mass, relative to 100 parts by mass of the total amount of the polyols (A) which constitute the urethane prepolymer. Thereby, an adhesive capable of manifesting moisture permeability and ordinary state adhesive strength of practically sufficient levels can be obtained. Also, by the aforementioned combination of the polyols, a moisture-permeable film having practically sufficient mechanical strength can be obtained.

As for the polyols (A) used upon production of the urethane prepolymer which is used in the moisture-curable polyurethane hot melt adhesive of the invention, in addition to the above-described various polyols, other polyols can be used in combination in a scope of not impairing the purpose of the invention.

As the other polyols, for example, polyester polyols other than those mentioned above, polyether polyols, acrylpolyols, polycarbonate polyols, polyolefin polyols, castor oil-based polyols and the like can be used.

Next, the polyisocyanate (B) that is used in the production of the urethane prepolymer will be described.

As the polyisocyanate (B), for example, an aromatic polyisocyanates such as 4,4'-diphenylmethane diisocyanate, 2,4'-diphenylmethane diisocyanate, carbodiimide-modified diphenylmethane diisocyanate, crude diphenylmethane diisocyanate, phenylene diisocyanate, tolylene diisocyanate or naphthalene diisocyanate; an aliphatic polyisocyanates such as hexamethylene diisocyanate, lysine diisocyanate, cyclohexane diisocyanate, isophorone diisocyanate, dicyclohexylmethane diisocyanate, xylylene diisocyanate or tetramethylxylylene diisocyanate; or a polyisocyanate having an alicyclic structure can be used. Among these, it is preferable to use diphenylmethane diisocyanate which has a low vapor pressure at the time of heating and melting, from the viewpoint of using the moisture-curable polyurethane hot melt adhesive of the invention after heating and melting the adhesive.

Next, the method for producing the urethane prepolymer used in the invention will be described in detail.

The urethane prepolymer used in the invention can be produced by a known conventional method. For example, the urethane prepolymer can be produced by separately adding dropwise dehydrated polyols (A), that is, the polyester polyol (a-1), the crystalline polyester polyol (a-2), the polyoxyethylene glycol (a-3), and if necessary, the other polyols, respectively, or adding dropwise a mixture of these, to the polyisocyanate (B) in a reaction container, and then heating the mixture to react until the hydroxyl groups of the polyols (A) substantially disappear.

The production of the urethane prepolymer can be usually carried out without solvent, but the production may also be carried out by reacting the reaction in an organic solvent. In the case of performing the reaction in an organic solvent, an organic solvent which does not impede the reaction, such as ethyl acetate, n-butyl acetate, methyl ethyl ketone or toluene can be used, but it is necessary to remove the organic solvent by a method such as heating under reduced pressure, in the middle of the reaction or after completion of the reaction.

In order to produce the urethane prepolymer, a urethanization catalyst can be used as necessary. The urethanization catalyst can be appropriately added at any stage of the reaction.

As the urethanization catalyst, for example, nitrogen-containing compounds such as triethylamine, triethylenediamine and N-methylmorpholine; metal salts such as potassium acetate, zinc stearate and tin octanoate; and organometallic compounds such as dibutyltin dilaurate can be used.

For the ratio of use of the polyols (A) and the polyisocyanate (B) in the production of the urethane prepolymer, the equivalent ratio of the isocyanate group carried by the polyisocyanate (B) and the hydroxyl group of the polyols (A) ([NCO/OH]) is preferably in the range of 1.1 to 5.0, and more preferably in the range of 1.5 to 3.0. By adjusting the equivalent ratio into such range, the hot melt viscosity can be suitably adjusted, and a moisture-curable polyurethane hot melt adhesive having good coatability can be obtained. Furthermore, by adjusting the equivalent ratio of [NCO/OH] to the aforementioned range, the coatability of the moisture-curable polyurethane hot melt composition which is used in the production of a moisture-permeable film can be enhanced.

The moisture-curable polyurethane hot melt adhesive of the invention preferably has a melt viscosity at 125° C. in the range of 500 to 9000 mPa·s.

In the moisture-curable polyurethane hot melt adhesive of the invention, if necessary, additives such as a tackifier, a curing catalyst, a stabilizer, a plasticizer, a filler material, a dye, a pigment, a fluorescent brightening agent, a silane coupling agent, a wax, and an anti-blocking agent, thermoplastic resins and the like, can be appropriately selected and used in addition to the urethane prepolymer, in a scope of not impairing the purpose of the invention.

As the tackifier, for example, rosin-based resins, rosin ester-based resins, hydrogenated rosin ester-based resins, terpene-based resins, terpene phenol-based resins, hydrogenated terpene-based resins, or $C_5$ aliphatic resins, $C_9$ aromatic resins and $C_5$ and $C_9$ copolymer resins as petroleum resins, and the like can be used.

As for the plasticizer, for example, dibutyl phthalate, dioctyl phthalate, dicyclohexyl phthalate, diisooctyl phthalate, diisodecyl phthalate, dibenzyl phthalate, butylbenzyl phthalate, trioctyl phosphate, epoxy-based plasticizers, toluenesulfoamide, chloroparaffins, adipic acid ester, castor oil and the like can be used.

As the stabilizer, for example, hindered phenol-based compounds, benzotriazole-based compounds, hindered amine-based compounds and the like can be used.

As the filler material, for example, silicic acid derivatives, talc, powdered metals, calcium carbonate, clay, carbon black, fumed silica and the like can be used.

As the anti-blocking agent, for example, fatty acid amide-based compounds, finely powdered silica, inorganic balloons, organic balloons, finely powdered cellulose-based derivatives and the like can be used.

Furthermore, even upon the production of the moisture-permeable film of the invention, the additives as described above can be used according to necessity, but from the viewpoint of maintaining transparency or the like, it is preferable to not use them as much as possible.

The moisture-curable polyurethane hot melt adhesive can be suitably used as a moisture-curable polyurethane hot melt adhesive for various moisture-permeable base materials, and for example, can be used in the production of a laminate in which a moisture-permeable base material (I) and a moisture-permeable base material (II) of the same type or different type with respect to the moisture-permeable base material (I) are bonded.

As for the method for producing the laminate, specifically, there is a method of continuously applying or intermittently applying the moisture-curable polyurethane hot melt adhesive in a heated molten state on a moisture-permeable base material (I), placing a moisture-permeable base material (II) of the same type or different type with respect to the former on the adhesive-applied surface, and pressing and curing the assembly for several hours to several days. Here, the application of the adhesive may be performed on the base material surface of any one of the moisture-permeable base material (I) and the moisture-permeable base material (II), or may also be performed on the base material surfaces of both base materials.

The moisture-curable polyurethane hot melt adhesive can also be used in the production of, for example, a laminate in which on both sides of a moisture-permeable base material (I), a moisture-permeable base material (II) of the same type or different type with respect to the moisture-permeable base material (I) is adhered. This laminate can be produced by continuously applying or intermittently applying the moisture-curable polyurethane hot melt adhesive in a heated molten state on one surface of a moisture-permeable base material (I), placing a moisture-permeable base material (II) of the same type or different type with respect to the former on the adhesive-applied surface, pressing the assembly, subsequently applying the adhesive on the other surface of the moisture-permeable base material (I) by the same method as described above, placing moisture-permeable base material (II) thereon, and pressing and curing the assembly for several hours to several days by a conventionally known method.

As for the moisture-permeable base material (I), for example, moisture-permeable films obtained by using resins such as solvent-based or aqueous polyurethane resins, thermoplastic polyurethane resins (TPU), thermoplastic polyester resins (TPE), and porous polytetrafluoroethylene (PTFE), or fibrous base materials such as non-woven fabrics, woven fabrics and knitted fabrics can be used.

As for the moisture-permeable base material (II), such base materials of the same type or different type with respect to the moisture-permeable base material (I) can be used in accordance with the uses of the laminate obtained. In particular, in the case of using the laminate in sportswear or the like, it is preferable to use a fibrous base material as the moisture-permeable base material (I), and a moisture-permeable film formed from a porous polytetrafluoroethylene or polyurethane resin, or the moisture-permeable film of the invention that will be described later, as the moisture-permeable base material (II).

The application of the adhesive is preferably carried out by intermittent application, from the viewpoint of maintaining good moisture permeability or pliability of the base material. As for the intermittent application method, a method of applying the adhesive in a dotted pattern, or a method of applying the adhesive in a reticulate pattern may be mentioned, and among them, the method of applying the adhesive in a dotted pattern is preferred.

The moisture-curable polyurethane hot melt adhesive can be applied on the moisture-permeable base material (I) or the moisture-permeable base material (II) by, for example, a gravure transfer coating method using a carved roll, a screen coating method, a T-die coating method, a fiber coating method or the like.

The heating and melting temperature of the moisture-curable polyurethane hot melt adhesive in that case is preferably 80 to 130° C., and more preferably 80 to 120° C.

The laminates obtained by the above-described methods can be used in, for example, sportswear, raincoats, shoes, firefighter uniform, military uniform and the like.

Next, the moisture-permeable film of the invention will be described.

The moisture-permeable film of the invention is a product obtained by processing a moisture-curable polyurethane hot melt composition containing a urethane prepolymer into a film form or a sheet form, the urethane prepolymer being obtained by reacting polyols (A) which include: a polyester polyol (a-1) obtained by reacting a polyol prepared by addition of alkylene oxide to bisphenol A, with an aliphatic polycarboxylic acid and an aromatic polycarboxylic acid; a crystalline polyester polyol (a-2); and a polyoxyethylene glycol (a-3) having a number average molecular weight of 2000 to 25000, with polyisocyanate (B).

Since the moisture-permeable film of the invention is a product of processing a moisture-curable polyurethane hot melt composition which does not substantially contain a dissolving medium such as solvent or water, into a film form or a sheet form as described above, the production does not require a process for volatilizing a dissolving medium. For that reason, it is possible to significantly reduce the amount of energy consumption required in the production, as compared to conventional moisture-permeable films.

The moisture-permeable film may vary in the thickness depending on the uses or the like, but preferably has a film thickness in the range of approximately 5 to 50 μm. In the case where moisture permeability of a further higher level is required, the film thickness is more preferably in the range of 5 to 20 μm.

As the moisture-curable polyurethane hot melt composition used in the production of the moisture-permeable film, an composition similar to the moisture-curable polyurethane hot melt adhesive can be used, and it is preferable to use the same raw material composition or the same method for production, and the same preferred embodiments, as those as be described for the moisture-curable polyurethane hot melt adhesive above.

The moisture-permeable film can be produced by, for example, processing the moisture-curable polyurethane hot melt composition into a film form by a die coating method, a roll coating method or the like.

The moisture-permeable film of the invention can be used in, for example, the moisture-permeable films which are present in the middle between the outer garment and the inner garment, which constitute the moisture-permeable, waterproof clothing for sportswear, raincoats, shoes, firefighter uniform, military uniform and the like, or in air filters.

The moisture-permeable film of the invention is preferably used as the moisture-permeable base material (I) and the moisture-permeable base material (II) used in the production of the aforementioned laminate. For example, a laminate can be produced by intermittently applying the moisture-curable polyurethane hot melt adhesive in a heated molten state on a moisture-permeable base material (I) such as a fibrous base material, and placing and adhering the moisture-permeable film of the invention on the adhesive-applied surface.

The laminate obtained by this method can be used in, for example, sportswear, raincoats, shoes, firefighter uniform, military uniform, and the like.

EXAMPLES

Hereinafter, the invention will be described more specifically by way of Examples and Comparative Examples.

Example 1

Moisture-curable Polyurethane Hot Melt Adhesive A

In one-liter four-necked flask, 15 parts by mass of a polyester polyol (a-1-1) having a number average molecular weight of 2000 obtained by reacting an adduct of 6 moles of propylene oxide to bisphenol A to react with isophthalic acid and sebacic acid; 20 parts by mass of a crystalline polyester polyol (a-2-1) having a number average molecular weight of 2000 and having 15% by mass of a neopentyl glycol-derived 2,2-dimethyl-1,3-propylene group, which was obtained by reacting 14.4 parts by mass of neopentyl glycol, 34.5 parts by mass of 1,6-hexanediol and 51 parts by mass of adipic acid; and 65 parts by mass of a polyoxyethylene glycol (a-3-1) having a number average molecular weight of 4000 were added, and the mixture was heated under reduced pressure at 120° C. The resultant was dehydrated until the moisture content inside the flask reached 0.05% by mass.

Subsequently, the interior of the flask was cooled to a temperature of 70° C., and then 18 parts by mass of 4,4'-diphenylmethane diisocyanate was added thereto. The mixture was allowed to react for 3 hours at 90° C. until the NCO content became constant, to thereby obtain a moisture-curable polyurethane hot melt adhesive A. The viscosity of the adhesive A at 125° C. was measured with a cone-plate viscometer, and was found to be 1100 mPa·s. The NCO content was 2.72% by mass.

[Production of Laminate A1]

A mixture of CRISVON S-525 (manufactured by DIC Corporation), which is a solvent type polyurethane resin, with methyl ethyl ketone and dimethylformamide, was uniformly applied on a releasable paper using a knife coater such that the amount of coating would be 100 g/m² (wet), and then the coating was dried for 1 minute at 70° C., and then dried for 2 minutes at 120° C., to thus produce a moisture-permeable polyurethane film 1 having a thickness of 15 μm. The moisture permeance of the moisture-permeable polyurethane film 1 alone was measured according to JIS L1099 (A-1: calcium chloride method), and was found to be 10,000 g/m²/24 hr.

Subsequently, the moisture-curable polyurethane hot melt adhesive A which had been heated and melted at 100° C. was intermittently applied at 20 g/m² on the moisture-permeable polyurethane film 1 (width 1 m, length 1 m), by using a lattice-shaped gravure roll heated to 100° C., and then a fibrous base material of 40-denier nylon taffeta was bonded to the adhesive-applied surface. The assembly was left to stand for three days in an environment at a temperature of 23° C. and a relative humidity of 65%, to thus produce a laminate A1.

[Production of Moisture-permeable Film A2]

A moisture-curable polyurethane hot melt composition having the same composition as that of the moisture-curable polyurethane hot melt adhesive A was heated and melted at 120° C., and was applied on a releasable paper using a knife coater heated to 120° C., to a thickness of 30 μm. The coating was left to stand for three days in an environment at a temperature of 23° C. and a relative humidity of 65%, to allow a moisture curing reaction to proceed. After the standing, the formed film was peeled off from the releasable paper, to obtain a moisture-permeable film A2.

Examples 2 to 7 and Comparative Examples 1 to 9

Moisture-curable polyurethane hot melt adhesives B to P, laminates B1 to P1, and moisture-permeable films B2 to P2 were produced by the same method as in Example 1, except that the composition of the polyol and polyisocyanate was changed as described in the following Tables 1 to 3.

[Methods for Evaluation of Moisture Permeance, Ordinary State Adhesive Strength, Water-resistant Adhesive Strength and Texture]

[Method for Measurement of Moisture Permeance of Laminate and Moisture-permeable Film]

The measurement was performed according to JIS L1099 (A-1: calcium chloride method).

Laminates and moisture-permeable films having a moisture permeability of approximately 6000 or larger can be said to have practically sufficient moisture permeability.

[Method for Measurement of Ordinary State Adhesive Strength]

A hot melt fabric tape having a width of 1 inch (manufactured by San Kasei Corp.) was adhered to the surface of the moisture-permeable polyurethane film 1 constituting the respective laminates, for 5 seconds at 130° C., and then the ordinary state adhesive strength at a temperature of 23° C. and a relative humidity of 65% was measured according to JIS K6854-2, using a Tensilon tester (head speed=200 mm/min). If the ordinary state adhesive strength is 1.0 or greater, the adhesive strength can be said to be practically sufficient.

[Method for Measurement of Water-resistant Adhesive Strength]

Each of the laminates was laundered in water 50 times according to JIS L1089-1970. The change in the external appearance of the laminate after laundering was evaluated by the following criteria.

1: Complete absence of peeling.
2: Slight peeling in some cases.
3: Peeling in more than a half of the adhesion area.

Furthermore, the water-resistant adhesive strength (water-resistant launderability) of the laminate after laundering was evaluated based on the [Method for measurement of ordinary state adhesive strength].

[Method for Measurement of Texture (Pliability)]

The texture of the laminates and the moisture-permeable films was evaluated on the basis of the following five grades, by bending each of the laminates and the moisture-permeable films by hand. Among the five grades, a grade of 3 or lower is practically preferred.

1: Highly pliable.
2: Fairly pliable.
3: Pliable.
4: Fairly rigid.
5: Rigid.

TABLE 1

| Composition | | Example 1 | Example 2 | Example 3 | Example 4 | Example 5 | Example 6 | Example 7 |
|---|---|---|---|---|---|---|---|---|
| Polyester polyol (a-1-1) | Parts | 15 | 10 | 35 | 10 | 15 | 15 | 15 |
| Crystalline polyester polyol (a-2-1) | by mass | 20 | 25 | 30 | 10 | 20 | 20 | — |
| Crystalline polyester polyol (a-2-2) | | — | — | — | — | — | — | 20 |
| PEG4000 (a-3-1) | | 65 | 65 | 35 | 80 | 65 | — | 65 |
| PEG20000 (a-3-2) | | — | — | — | — | — | 65 | — |
| 4,4'-MDI | | 18.0 | 18.0 | 16.0 | 17.0 | — | 14.5 | 18.0 |
| XDI | | — | — | — | — | 13.5 | — | — |
| Adhesive | | A | B | C | D | E | F | G |

TABLE 1-continued

| Composition | Example 1 | Example 2 | Example 3 | Example 4 | Example 5 | Example 6 | Example 7 |
|---|---|---|---|---|---|---|---|
| Melt viscosity (mPa/125° C.) | 1100 | 1000 | 1350 | 800 | 900 | 1100 | 1000 |
| [NCO/OH] equivalent ratio | 2.13 | 2.13 | 1.95 | 2.27 | 2.12 | 2.13 | 2.13 |
| NCO mass % | 2.72 | 2.72 | 2.73 | 2.73 | 2.82 | 2.72 | 2.71 |
| Softening point (° C.) | 55 | 58 | 48 | 54 | 55 | 55 | 60 |
| Laminate | A1 | B1 | C1 | D1 | E1 | F1 | G1 |
| Texture | 1 | 1 | 1 | 2 | 1 | 1 | 2 |
| Ordinary state adhesive strength (kg/inch) | 2.0 | 1.8 | 2.2 | 1.7 | 2.0 | 2.0 | 1.8 |
| Moisture permeance (A-1 method) (g/m$^2$/24 hr) | 11000 | 12000 | 9000 | 12500 | 11000 | 11000 | 10000 |
| Changes in external appearance after laundering in water | 1 | 1 | 1 | 1 | 1 | 1 | 1 |
| Adhesive strength after laundering in water (kg/inch) | 2.0 | 1.8 | 2.2 | 1.6 | 2.0 | 2.0 | 1.8 |
| Moisture-permeable film | A2 | B2 | C2 | D2 | E2 | F2 | G2 |
| Texture | 1 | 1 | 1 | 2 | 1 | 1 | 2-3 |
| Moisture permeance (A-1 method) (g/m$^2$/24 hr) | 8000 | 7800 | 6500 | 10000 | 8000 | 11000 | 7500 |

TABLE 2

| Composition | | Comparative Example 1 | Comparative Example 2 | Comparative Example 3 | Comparative Example 4 | Comparative Example 5 | Comparative Example 6 |
|---|---|---|---|---|---|---|---|
| Polyester polyol (a-1-1) | Parts | — | — | 15 | 15 | 35 | — |
| Crystalline polyester polyol (a-2-1) | by mass | 25 | — | 20 | 25 | — | — |
| PEG4000 (a-3-1) | | 75 | 100 | — | — | 65 | — |
| PPG2000 (a'-3-1) | | — | — | 65 | — | — | — |
| PTMG2000 (a'-3-2) | | — | — | — | 65 | — | — |
| 4,4'-MDI | | 17.5 | 15.5 | 21.0 | 21.0 | 18.0 | — |
| H-1041 | | — | — | — | — | — | 100 |
| Adhesive | | H | I | J | K | L | M |
| Melt viscosity (mPa/125° C.) | | 900 | 700 | 1500 | 1700 | 1100 | 6500 |
| [NCO/OH] equivalent ratio | | 2.24 | 2.48 | 1.87 | 1.87 | 2.13 | 1.85 |
| NCO mass % | | 2.77 | 2.69 | 2.70 | 2.70 | 2.72 | 2.00 |
| Softening point (° C.) | | 55 | 55 | 25 | 50 | 45 | 72 |
| Laminate | | H1 | I1 | J1 | K1 | L1 | M1 |
| Texture | | 5 | 5 | 2 | 2 | 3 | 5 |
| Ordinary state adhesive strength (kg/inch) | | 1.5 | 1.3 | 1.6 | 1.8 | 1.2 | 1.8 |
| Moisture permeance (A-1 method) (g/m$^2$/24 hr) | | 10000 | 12000 | 5000 | 4000 | 11000 | 5000 |
| Changes in external appearance after laundering in water Peel strength after laundering in water (kg/inch) | | 2<br>0.5 | 3<br>0.3 | 1<br>1.0 | 1<br>1.8 | 2<br>0.6 | 1<br>1.8 |
| Moisture-permeable film | | H2 | I2 | J2 | K2 | L2 | M2 |
| Texture | | 5 | 5 | 2 | 2 | 3 | 5 |
| Moisture permeance (A-1 method) (g/m$^2$/24 hr) | | 8500 | 12000 | 150 | 300 | 6500 | 50 |

TABLE 3

| Composition | | Comparative Example 7 | Comparative Example 8 | Comparative Example 9 |
|---|---|---|---|---|
| Polyester polyol (a-1-1) | Parts by mass | 10 | 15 | 15 |
| Crystalline polyester polyol (a-2-1) | | 25 | 20 | 20 |
| PEG1500 (a'-3-3) | | 65 | — | — |
| PPG4000 (a'-3-4) | | — | 65 | — |
| PTMG4000 (a'-3-5) | | — | — | 65 |
| 4,4'-MDI | | 25.0 | 16.0 | 17.0 |
| Adhesive | | N | O | P |
| Melt viscosity (mPa/125° C.) | | 1000 | 1350 | 800 |
| [NCO/OH] equivalent ratio | | 2.13 | 1.95 | 2.27 |
| NCO mass % | | 2.72 | 2.73 | 2.73 |
| Softening point (° C.) | | 58 | 48 | 54 |
| Laminate | | N1 | O1 | P1 |
| Texture | | 1 | 1 | 2 |
| Ordinary state adhesive strength (kg/inch) | | 1.8 | 2.2 | 1.7 |

TABLE 3-continued

| Composition | Comparative Example 7 | Comparative Example 8 | Comparative Example 9 |
|---|---|---|---|
| Moisture permeance (A-1 method) (g/m$^2$/24 hr) | 5500 | 4000 | 5000 |
| Changes in external appearance after laundering in water | 1 | 1 | 1 |
| Adhesive strength after laundering in water (kg/inch) | 1.8 | 2.2 | 1.6 |
| Moisture-permeable film | N2 | O2 | P2 |
| Texture | 1 | 1 | 2 |
| Moisture permeance (A-1 method) (g/m$^2$/24 hr) | 4200 | 150 | 320 |

The abbreviations in Table 1 to Table 3 will be explained.

"Polyester polyol (a-1-1)": Polyester polyol obtained by reacting an adduct of 6 moles of propylene oxide to bisphenol A to react with sebacic acid and isophthalic acid (number average molecular weight 2000)

"Crystalline polyester polyol (a-2-1)": Crystalline polyester polyol obtained by reacting neopentyl glycol, 1,6-hexanediol and adipic acid (number average molecular weight 2000)

"Crystalline polyester polyol (a-2-2)": Crystalline polyester polyol obtained by reacting 1,6-hexanediol and adipic acid (number average molecular weight 2000)

"PEG4000 (a-3-1)": Polyoxyethylene glycol (number average molecular weight 4000)

"PEG20000 (a-3-2)": Polyoxyethylene glycol (number average molecular weight 20000)

"PPG 2000 (a'-3-1)": Polyoxypropylene glycol (number average molecular weight 2000)

"PTMG2000 (a'-3-2)": Polytetramethylene glyol (number average molecular weight 2000)

"PEG 1500 (a'-3-3)": Polyoxyethylene glycol (number average molecular weight 1500)

"PPG 4000 (a'-3-4)": Polyoxypropylene glycol (number average molecular weight 4000)

"PTMG4000 (a'-3-5)": Polytetramethylene glyol (number average molecular weight 4000)

"4,4'-MDI": 4,4'-diphenylmethane diisocyanate

"XDI": Xylylene diisocyanate

"H-1041": Moisture-curable polyurethane hot melt adhesive manufactured by DIC Corp.

Comparative Example 10

A mixture of CRISVON S-525 (manufactured by DIC Corp.), which is a solvent type polyurethane resin, with methyl ethyl ketone and dimethylformamide, was uniformly applied on a releasable paper using a knife coater such that the amount of coating would be 100 g/m$^2$ (wet). Subsequently, the coating was dried for 1 minute at 70° C., and then dried for 2 minutes at 120° C., to obtain a moisture-permeable film P2 having a thickness of 15 µm. The moisture permeance of the moisture-permeable film P2 was measured by the same method as described above, and was found to be 10,000 g/m$^2$/24 hr.

[Regarding Volatilization of Organic Solvents]

In the production of the moisture-permeable film Q2, an organic solvent solution of a polyurethane resin was used. Therefore, a process for volatilization of organic solvent was required in the production of the moisture-permeable film Q2.

On the other hand, the moisture-curable polyurethane hot melt composition used in the production of the moisture-permeable films A2-G2 described in the Examples, did not substantially contain any dissolving medium, and thus, a process for volatilization of dissolving medium was unnecessary in the production of the moisture-permeable films. Therefore, according to the present invention, it was possible to reduce the energy required in the production to a large extent, as compared to the conventional technology as shown in Comparative Example 10.

The invention claimed is:

1. A moisture-curable polyurethane hot melt adhesive consisting essentially of a urethane prepolymer which is obtained by reacting
   polyols (A) which comprise:
      a polyester polyol (a-1) obtained by reacting a polyol prepared by addition of alkylene oxide to bisphenol A, with an aliphatic polycarboxylic acid and an aromatic polycarboxylic acid;
      a crystalline polyester polyol (a-2); and
      a polyoxyethylene glycol (a-3) having a number average molecular weight of 2000 to 25000,
   with polyisocyanate (B).

2. The moisture-curable polyurethane hot melt adhesive according to claim 1, wherein the polyols (A) comprises
   5 to 30 parts by mass of the polyester polyol (a-1),
   10 to 30 parts by mass of the crystalline polyester polyol (a-2), and
   30 to 85 parts by mass of the polyoxyethylene glycol (a-3),
relative to 100 parts by mass of the total amount of the polyols (A).

3. The laminate comprising
   a moisture-permeable base material (I) and
   a moisture-permeable film obtained by curing a moisture-curable polyurethane hot melt composition of a urethane prepolymer which is obtained by
   reacting polyols (A) which comprise:
      a polyester polyol (a-1) obtained by reacting a polyol prepared by addition of alkylene oxide to bisphenol A, with an aliphatic polycarboxylic acid and an aromatic polycarboxylic acid;
      a crystalline polyester polyol (a-2); and
      a polyoxyethylene glycol (a-3) having a number average molecular weight of 2000 to 25000,
   with polyisocyanate (B)
   wherein the moisture-permeable film is adhered on one side or on both sides of the moisture-permeable base material (I) on which the moisture-curable polyurethane hot melt adhesive according to claim 2 in a heated molten state is applied intermittently.

4. The moisture-curable polyurethane hot melt adhesive according to claim 1, wherein the crystalline polyester polyol (a-2) is obtained by reacting a polyol comprising neopentyl glycol, with a polycarboxylic acid.

5. The laminate comprising
a moisture-permeable base material (I) and
a moisture-permeable film obtained by curing a moisture-curable polyurethane hot melt composition of a urethane prepolymer which is obtained by
reacting polyols (A) which comprise:
   a polyester polyol (a-1) obtained by reacting a polyol prepared by addition of alkylene oxide to bisphenol A, with an aliphatic polycarboxylic acid and an aromatic polycarboxylic acid;
   a crystalline polyester polyol (a-2); and
   a polyoxyethylene glycol (a-3) having a number average molecular weight of 2000 to 25000,
with polyisocyanate (B)
wherein the moisture-permeable film is adhered on one side or on both sides of the moisture-permeable base material (I) on which the moisture-curable polyurethane hot melt adhesive according to claim 4 in a heated molten state is applied intermittently.

6. The moisture-curable polyurethane hot melt adhesive according to claim 1, wherein the crystalline polyester polyol (a-2) has 10 to 30% by mass of a neopentyl glycol-derived 2,2-dimethyl-1,3-propylene group.

7. The laminate comprising
a moisture-permeable base material (I) and
a moisture-permeable film obtained by curing a moisture-curable polyurethane hot melt composition of a urethane prepolymer which is obtained by
reacting polyols (A) which comprise:
   a polyester polyol (a-1) obtained by reacting a polyol prepared by addition of alkylene oxide to bisphenol A, with an aliphatic polycarboxylic acid and an aromatic polycarboxylic acid;
   a crystalline polyester polyol (a-2); and
   a polyoxyethylene glycol (a-3) having a number average molecular weight of 2000 to 25000,
with polyisocyanate (B)
wherein the moisture-permeable film is adhered on one side or on both sides of the moisture-permeable base material (I) on which the moisture-curable polyurethane hot melt adhesive according to claim 6 in a heated molten state is applied intermittently.

8. A laminate comprising
a moisture-permeable base material (I) and
a moisture-permeable base material (II) of the same type or different type with respect to the moisture-permeable base material (I),
wherein the moisture-permeable base material (II) is adhered on one side or on both sides of the moisture-permeable base material (I) on which the moisture-curable polyurethane hot melt adhesive according to claim 1 in a heated molten state is applied intermittently.

9. The laminate according to claim 8, wherein the moisture-permeable base material (I) is a fibrous base material, and the moisture-permeable base material (II) is a moisture-permeable film formed from a polytetrafluoroethylene or polyurethane resin.

10. The laminate comprising
a moisture-permeable base material (I) and
a moisture-permeable film obtained by curing a moisture-curable polyurethane hot melt composition of a urethane prepolymer which is obtained by
reacting polyols (A) which comprise:
   a polyester polyol (a-1) obtained by reacting a polyol prepared by addition of alkylene oxide to bisphenol A, with an aliphatic polycarboxylic acid and an aromatic polycarboxylic acid;
   a crystalline polyester polyol (a-2); and
   a polyoxyethylene glycol (a-3) having a number average molecular weight of 2000 to 25000,
with polyisocyanate (B)
wherein the moisture-permeable film is adhered on one side or on both sides of the moisture-permeable base material (I) on which the moisture-curable polyurethane hot melt adhesive according to claim 1 in a heated molten state is applied intermittently.

11. The laminate comprising
a moisture-permeable base material (I) and
a moisture-permeable film obtained by curing a moisture-curable polyurethane hot melt composition of a urethane prepolymer which is obtained by
reacting polyols (A) which comprise:
   a polyester polyol (a-1) obtained by reacting a polyol prepared by addition of alkylene oxide to bisphenol A, with an aliphatic polycarboxylic acid and an aromatic polycarboxylic acid;
   a crystalline polyester polyol (a-2); and
   a polyoxyethylene glycol (a-3) having a number average molecular weight of 2000 to 25000,
with polyisocyanate (B),
   wherein the polyols (A) comprise:
      5 to 30 parts by mass of the polyester polyol (a-1),
      10 to 30 parts by mass of the crystalline polyester polyol (a-2), and
      30 to 85 parts by mass of the polyoxyethylene glycol (a-3),
      Relative to 100 parts by mass of the total amount of the polyols (A);
wherein the moisture-permeable film is adhered on one side or on both sides of the moisture-permeable base material (I) on which the moisture-curable polyurethane hot melt adhesive according to claim 1 in a heated molten state is applied intermittently.

12. The laminate comprising
a moisture-permeable base material (I) and
a moisture-permeable film obtained by curing a moisture-curable polyurethane hot melt composition of a urethane prepolymer which is obtained by
reacting polyols (A) which comprise:
wherein the moisture-permeable film is adhered on one side or on both sides of the moisture-permeable base material (I) on which the moisture-curable polyurethane hot melt adhesive according to claim 1 in a heated molten state is applied intermittently.

13. The laminate comprising
a moisture-permeable base material (I) and
a moisture-permeable film obtained by curing a moisture-curable polyurethane hot melt composition of a urethane prepolymer which is obtained by
reacting polyols (A) which comprise:
   a polyester polyol (a-1) obtained by reacting a polyol prepared by addition of alkylene oxide to bisphenol A, with an aliphatic polycarboxylic acid and an aromatic polycarboxylic acid;
   a crystalline polyester polyol (a-2); and
   a polyoxyethylene glycol (a-3) having a number average molecular weight of 2000 to 25000,
with polyisocyanate (B)
wherein the moisture-permeable film is adhered on one side or on both sides of the moisture-permeable base material (I) on which the moisture-curable polyurethane hot melt adhesive according to claim 1 in a heated molten state is applied intermittently.

14. The laminate comprising
a moisture-permeable base material (I) and
a moisture-permeable film obtained by curing a moisture-curable polyurethane hot melt composition of a urethane prepolymer which is obtained by
reacting polyols (A) which comprise:
  a polyester polyol (a-1) obtained by reacting a polyol prepared by addition of alkylene oxide to bisphenol A, with an aliphatic polycarboxylic acid and an aromatic polycarboxylic acid;
  a crystalline polyester polyol (a-2); and
  a polyoxyethylene glycol (a-3) having a number average molecular weight of 2000 to 25000,
with polyisocyanate (B),
  wherein the polyols (A) comprise:
    5 to 30 parts by mass of the polyester polyol (a-1),
    10 to 30 parts by mass of the crystalline polyester polyol (a-2), and
    30 to 85 parts by mass of the polyoxyethylene glycol (a-3),
    Relative to 100 parts by mass of the total amount of the polyols (A);
wherein the moisture-permeable film is adhered on one side or on both sides of the moisture-permeable base material (I) on which the moisture-curable polyurethane hot melt adhesive according to claim 2 in a heated molten state is applied intermittently.

15. A moisture-permeable film obtained by curing a moisture-curable polyurethane hot melt composition consisting essentially of a urethane prepolymer which is obtained by reacting polyols (A) which comprise:
  a polyester polyol (a-1) obtained by reacting a polyol prepared by addition of alkylene oxide to bisphenol A, with an aliphatic polycarboxylic acid and an aromatic polycarboxylic acid;
  a crystalline polyester polyol (a-2); and
  a polyoxyethylene glycol (a-3) having a number average molecular weight of 2000 to 25000,
with polyisocyanate (B).

16. The moisture-permeable film according to claim 15, wherein the polyols (A) comprises
  5 to 30 parts by mass of the polyester polyol (a-1),
  10 to 30 parts by mass of the crystalline polyester polyol (a-2), and
  30 to 85 parts by mass of the polyoxyethylene glycol (a-3),
relative to 100 parts by mass of the total amount of the polyols (A).

17. The moisture-permeable film according to claim 15, wherein the crystalline polyester polyol (a-2) is obtained by reacting a polyol comprising neopentyl glycol, with a polycarboxylic acid.

18. The moisture-permeable film according to claim 15, wherein the crystalline polyester polyol (a-2) has 10 to 30% by mass of a neopentyl glycol-derived 2,2-dimethyl-1,3-propylene group.

* * * * *